US012367067B2

(12) United States Patent
Ma et al.

(10) Patent No.: US 12,367,067 B2
(45) Date of Patent: Jul. 22, 2025

(54) CLOUD MIGRATION

(71) Applicant: UiPath, Inc., New York, NY (US)

(72) Inventors: Tao Ma, Bellevue, WA (US); Joseph Mar, Kirkland, WA (US); Gregory Charles Guidone, Madison, NJ (US)

(73) Assignee: UiPath, Inc., New York, NY (US)

( * ) Notice: Subject to any disclaimer, the term of this patent is extended or adjusted under 35 U.S.C. 154(b) by 655 days.

(21) Appl. No.: 17/493,010

(22) Filed: Oct. 4, 2021

(65) Prior Publication Data

US 2023/0108145 A1    Apr. 6, 2023

(51) Int. Cl.
*G06F 9/48* (2006.01)
*G06F 11/07* (2006.01)
*G06F 21/31* (2013.01)
*G06Q 10/0633* (2023.01)

(52) U.S. Cl.
CPC ........ *G06F 9/4856* (2013.01); *G06F 11/0721* (2013.01); *G06F 11/0769* (2013.01); *G06F 21/31* (2013.01); *G06Q 10/0633* (2013.01)

(58) Field of Classification Search
CPC ............... G06F 9/4856; G06F 11/0721; G06F 11/0769; G06F 21/31; G06F 2201/815; G06F 11/0709; G06F 11/0751; G06F 2201/82; G06F 21/6218; G06Q 10/0633
See application file for complete search history.

(56) References Cited

U.S. PATENT DOCUMENTS

| 10,514,988 | B2  |   | 12/2019 | Nagarkar et al. |           |
|------------|-----|---|---------|-----------------|-----------|
| 10,999,370 | B1  | * | 5/2021  | Schwartz        | H04L 67/1095 |
| 11,438,458 | B1  | * | 9/2022  | Gopalan         | G06N 20/00 |
| 2014/0279896 | A1 |   | 9/2014  | Branton et al.  |           |
| 2014/0280365 | A1 |   | 9/2014  | Krugmann et al. |           |
| 2015/0277404 | A1 |   | 10/2015 | Maturana et al. |           |
| 2016/0357535 | A1 |   | 12/2016 | Gravenites et al. |         |
| 2017/0371696 | A1 |   | 12/2017 | Prziborowski et al. |       |
| 2018/0268045 | A1 |   | 9/2018  | Orman et al.    |           |
| 2019/0005255 | A1 | * | 1/2019  | Ali             | G06F 21/62 |
| 2020/0387476 | A1 | * | 12/2020 | Yap             | G06F 9/4856 |
| 2021/0081256 | A1 |   | 3/2021  | Sathyanaraya et al. |       |

(Continued)

FOREIGN PATENT DOCUMENTS

KR    2019-0060010 B1    5/2019
WO    2016178923 A1    11/2016

OTHER PUBLICATIONS

Barr, "AWs Database Migration Service," AWS News Blog (Mar. 15, 2016).

(Continued)

*Primary Examiner* — Sisley N Kim
(74) *Attorney, Agent, or Firm* — Volpe Koenig

(57) ABSTRACT

Disclosed herein is a system. The system includes a memory and a processor. The memory stores processor executable instructions for a migration engine. The processor is coupled to the memory. The processor executes the migration engine to cause the system to implement an export operation for an on premises system to mine for data corresponding to automations or user specific arrangements. The processor, also, executes the migration engine to cause the system to implement an import operation of the data to a cloud environment to replicate the automations or user specific arrangements.

20 Claims, 11 Drawing Sheets

(56) References Cited

U.S. PATENT DOCUMENTS

| | | | |
|---|---|---|---|
| 2021/0240312 A1* | 8/2021 | Wohlstadter | G16H 10/40 |
| 2022/0091947 A1* | 3/2022 | Kothari | G06F 11/321 |
| 2022/0114150 A1* | 4/2022 | Saurabh | G06F 16/2358 |
| 2022/0179683 A1* | 6/2022 | Verma | H04L 43/08 |

OTHER PUBLICATIONS

Carbonite, "Business Server and Data Migration Solutions," www.carbonite.com/data-protection/data-migration-software (Apr. 11, 2018).
Cloudsfer, "On Premise to Cloud Migration Tool," www.cloudsfer.com/supported-systems/on-premise-to-cloud (Sep. 19, 2020).
Micro Focus, "Data Migration Software PlateSpin Migration," (May 14, 2019).
Supplementary European Search Report received in EP Application No. 21801406, dated Dec. 5, 2023 (2 pages).

* cited by examiner

CLOUD MIGRATION

BACKGROUND

The disclosure herein relates to the field of cloud migration, and particularly to on premises data cloud migration.

Conventional operating and software systems require users to manually create settings, configurations, robots, triggers, machines, queues, webhooks, and other entities on premises (i.e., within the conventional operating and software systems). Then, when the users desire to migrate to a cloud environment, conventional cloud systems require users to manually recreate the same on-prem settings, configurations, robots, triggers, machines, queues, webhooks, and other entities in the cloud environment. Thus, there is a need for a cloud migration tool.

SUMMARY

According to one or more embodiments, a system is provided. The system includes a memory and a processor. The memory stores processor executable instructions for a migration engine. The processor is coupled to the memory. The processor executes the migration engine to cause the system to implement an export operation for an on premises system to mine for data corresponding to automations or user specific arrangements. The processor, also, executes the migration engine to cause the system to implement an import operation of the data to a cloud environment to replicate the automations or user specific arrangements.

According to one or more embodiments, the system embodiment above can be implemented as a method, an apparatus, a device, and/or a computer program product.

BRIEF DESCRIPTION OF THE DRAWING(S)

A more detailed understanding may be had from the following description, given by way of example in conjunction with the accompanying drawings, wherein like reference numerals in the figures indicate like elements, and wherein.

DETAILED DESCRIPTION

The disclosure herein relates to the field of cloud migration, and particularly to on premises data cloud migration. For instance, on premises data cloud migration is implemented by a migration engine (i.e., a cloud migration tool) that includes software and/or hardware (e.g., processor executable code that is necessarily rooted in the hardware), such as robotic process automations (RPAs) or the like, that replicate existing on premises operating and software systems and corresponding data into a cloud environment. The migration engine, in turn, enables users to skip any manual recreation operations of automations via a user interface (UI) of the cloud environment. Accordingly, one or more technical effects, benefits, and advantages of the migration engine include enabling users to seamless migrate/move existing automations to the cloud environment without missing technical configurations and providing summaries of the migration/move that indicates successful and failed entity moves and data errors and warnings.

Figure 1:
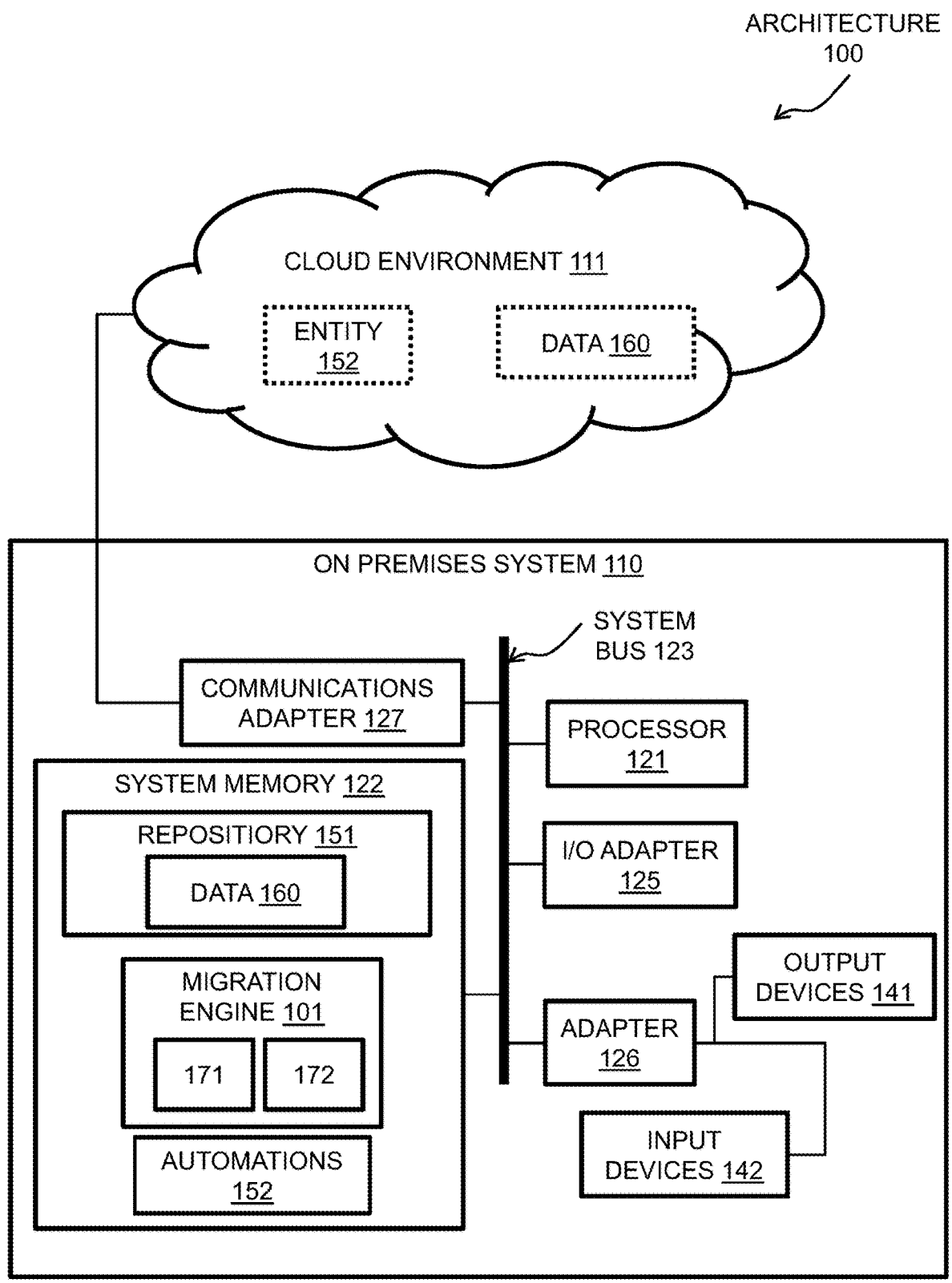
FIG. 1 depicts an architecture according to one or more embodiments.

Turning now to FIG. 1, an architecture 100 is illustrated according to one or more embodiments. The architecture 100 can be representative of one or more computing devices, computing apparatuses, and/or computing environments, which comprise hardware, software, or a combination thereof supporting a migration engine 101 (i.e., a cloud migration tool). Further, embodiments of the architecture 100 and the migration engine 1010 disclosed herein may include one or more apparatuses, systems, methods, and/or computer program products at any possible technical detail level of integration.

As shown, the architecture 100 has an on premises system 110 and a cloud environment 111. The one premises system 110 can include one or more existing applications 119, one or more processors 121, one or more system memories 122, a system bus 123, one or more adapters 125, 126, and 127, one or more input devices 141, and one or more output devices 142. The system memory 122 can support at least a repository 151, the migration engine 101, and one or more automations 152. The repository 151 can store data 160. Further, based on operations 171 and 172 of the migration engine 101, the one or more automations 152 and the data 160 can be migrated to the cloud environment 111 (as represented by the dotted-outline). Note that while a single block is shown for any one element of the architecture 100, the single block is representative of one or more of that element. Note, also, that any element of the architecture 100 may be referred to in the singular or in the plural herein. Further, any of the elements of the on premises system 110 can also be found in the cloud environment 111 as needed for proper operation of the migration engine 101.

The on premises system 110 can be any computing device or system adapted or configured to perform as an online platform, a server, an embedded computing system, a personal computer, a console, a personal digital assistant (PDA), a cell phone, a tablet computing device, a quantum computing device, cloud computing device, a mobile device, a smartphone, a fixed mobile device, a smart display, a wearable computer, or the like. On premises, which is also referred to as "on-premise," "on-premises," or "on-prem," is a location of deployed software, such as within the computing device or the system. In contrast to on premises, off premises can anywhere external to the computing device or the system, such as in the cloud environment 111. The on premises system 110 can, further, provide the one or more existing applications 119 that utilizes the automations 152 and the data 160. The one or more existing applications 119 is software that performs specific tasks, such as a orchestration software (i.e., On-Prem Orchestrator) that provides automated configuration, coordination, and management of the on premises system 110, as well as word processor, graphic, database, spreadsheet, presentations, web browser, and enterprise software.

The cloud environment 111 can be any computing environment external to the on premises system 110. The cloud environment 111 can provide on-demand availability of resources therein, especially data storage and computing power, distributed over multiple physical locations (e.g., one or more data centers). The cloud environment 111 can, further, provide a replication of any application that are within the on premises system 110, such as a cloud organization or a Cloud Orchestrator that mirrors the existing application 119 or the On-Prem Orchestrator.

The processor 121 may be any type of general or specific purpose processor, including a central processing unit (CPU), application specific integrated circuit (ASIC), field programmable gate array (FPGA), graphics processing unit (GPU), controller, multi-core processing unit, three dimensional processor, quantum computing device, or any combination thereof. The processor 121 may also have multiple processing cores, and at least some of the cores may be configured to perform specific functions. Multi-parallel processing may also be configured with the processor 121. The processor 121, also referred to as a processing circuit, is coupled via the system bus 123 to a system memory 122 and various other components.

The system memory 122 is an example of a (non-transitory) computer readable storage medium, where the repository 151, the migration engine 101, and the automation 152 can be located/managed/stored. Further, the system memory 122 can include any combination of a read only memory (ROM), a random access memory (RAM), internal or external Flash memory, embedded static-RAM (SRAM), solid-state memory, cache, static storage, or any other types of volatile or non-volatile memory. Non-transitory computer readable storage mediums may be any media that can be accessed by the processor 121 and may include any media that is removable, non-removable, or the like.

The system bus 123 is a wiring or other mechanism configured for communicating information (e.g., the data 160) between the processor 121, the system memory 122, and various other components.

With respect to the adapters 125, 126, and 127, the on premises system 110 can particularly include an input/output (I/O) adapter 125, a device adapter 126, and a communications adapter 127.

According to one or more embodiments, the I/O adapter 125 can be configured as a small computer system interface (SCSI), of in view of frequency division multiple access (FDMA) single carrier FDMA (SC-FDMA), time division multiple access (TDMA), code division multiple access (CDMA), orthogonal frequency-division multiplexing (OFDM), orthogonal frequency-division multiple access (OFDMA), global system for mobile (GSM) communications, general packet radio service (GPRS), universal mobile telecommunications system (UMTS), cdma2000, wideband CDMA (W-CDMA), high-speed downlink packet access (HSDPA), high-speed uplink packet access (HSUPA), high-speed packet access (HSPA), long term evolution (LTE), LTE Advanced (LTE-A), 802.11x, Wi-Fi, Zigbee, Ultra-WideBand (UWB), 802.16x, 802.15, home Node-B (HnB), Bluetooth, radio frequency identification (RFID), infrared data association (IrDA), near-field communications (NFC), fifth generation (5G), new radio (NR), or any other wireless or wired device/transceiver for communication.

The device adapter 126 interconnects input/output devices 141 and 142 to the system bus 123, such as a display, a keyboard, a control device, or the like (e.g., a camera, a speaker, etc.).

The communications adapter 126 interconnects the system bus 123 with the could environment 111, which may be through a network, enabling the on premises system 110 to communicate the automations 152 and the data 160.

The adapters 125, 126, and 127 may be connected to one or more I/O buses that are connected to the system bus 123 via an intermediate bus bridge. Suitable I/O buses for connecting peripheral devices, such as hard disk controllers, network adapters, and graphics adapters typically include common protocols, such as the Peripheral Component Interconnect (PCI).

The input device 141 can be a control device, such as a keyboard, a computer mouse, a touchpad, a touch screen, a keypad, or the like, for input to the on premises system 110. In addition, one or more inputs may be provided to the on premises system 110 remotely via another computing system in communication therewith, or the on premises system 110 may operate autonomously.

The output device 142 is configured to provide one or more UIs or graphic UIs (GUIs), which can be generated, captured, and analyzed by the migration engine 101. Examples of the output device 142 can include, but are not limited to, a plasma, a liquid crystal display (LCD), a light emitting diode (LED), a field emission display (FED), an organic light emitting diode (OLED) display, a flexible OLED display, a flexible substrate display, a projection display, a 4K display, a high definition (HD) display, a Retina© display, an in-plane switching (IPS) display or the like. The output device 142 may be configured as a touch, three dimensional (3D) touch, multi-input touch, or multi-touch display using resistive, capacitive, surface-acoustic wave (SAW) capacitive, infrared, optical imaging, dispersive signal technology, acoustic pulse recognition, frustrated total internal reflection, or the like as understood by one of ordinary skill in the art for input/output (I/O).

The repository 151 can be any database (e.g., an SQL database) and/or another storage mechanism. According to one or more embodiments, the repository 151 can include the data 160 as described herein for access by the migration engine 101. The data 160 can include raw unstructured and/or structured data created or used by the automations 152. Example of data 160 include, but are not limited to, images, segments, hashes, video, frames, source data, robot video, historical data, and source code. According to one or more embodiments, the data 160 can be user specific arrangements including settings, configurations, triggers, and preferences.

Figure 2:
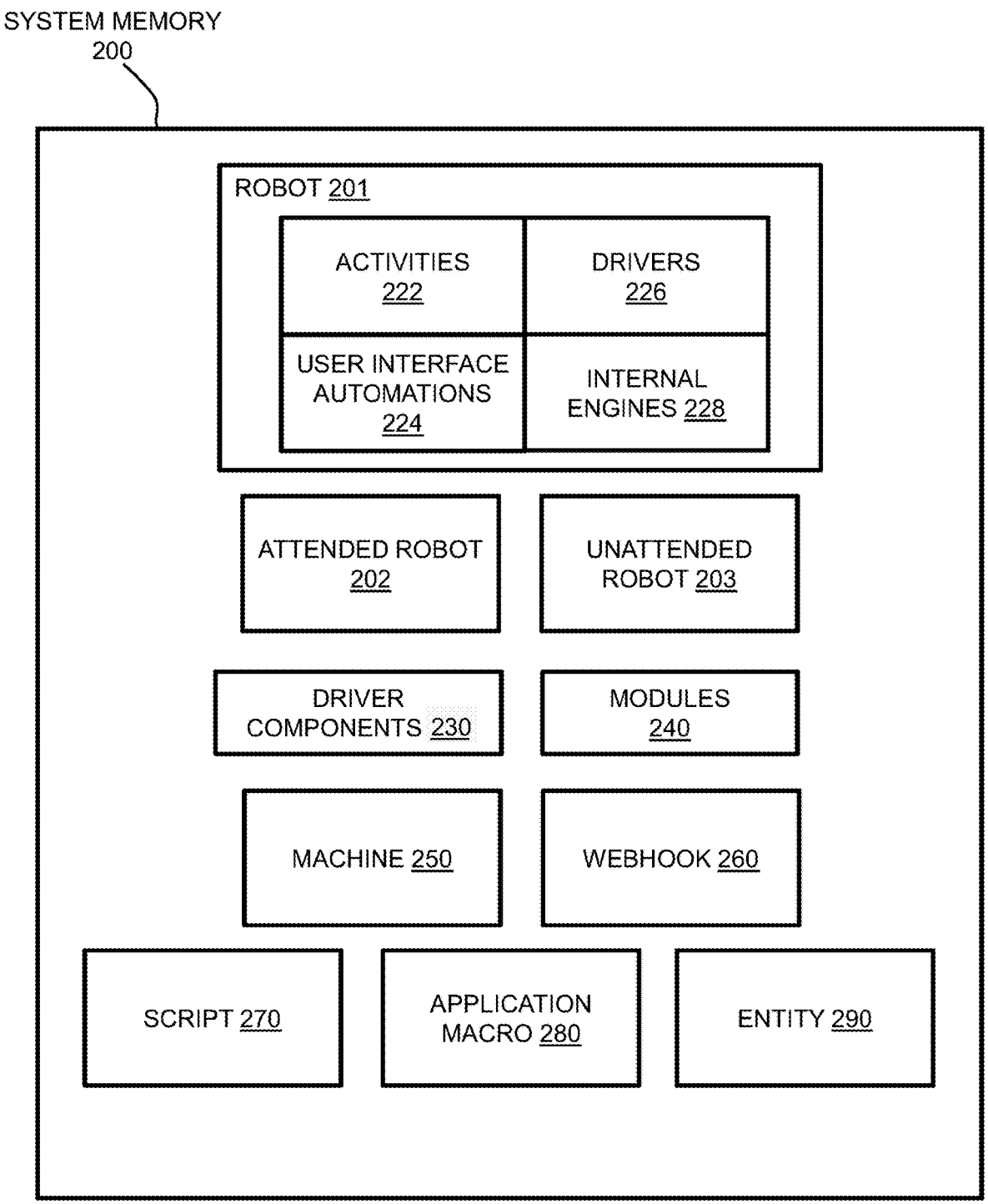
FIG. 2 depicts examples of automations according to one or more embodiments.

The automations 152 can be representative robots, machines, webhooks, scripts, applications macros, on-prem settings, configurations, triggers, queues, and other entities. Turning to FIG. 2, examples of the automations 151 are depicted according to one or more embodiments.

FIG. 2 also shows a system memory 200 storing one or more robots 201, 202, and 203. The system memory 200 is an example of the system memory 122 of FIG. 1. Generally, the migration engine 101 can include or operate in conjunction with a studio component that produces the one or more robots 201, 202, and 203 that perform one or more activities 222 and/or provide one or more UI automations 224 using one or more driver components 226 and/or internal engines 228. The one or more robots 201, 202, and 203 may also engage with other driver components 230 and modules 240.

For example, the robot 201 (as well as the attended robot 202 and the unattended robots 203) can be an application, an applet, or the like that may perform and/or automate one or more workflows (e.g., represented in part by the one or more activities 222 and/or provide the one or more UI automations 224). A workflow may include, but are not limited to, task sequences, flowcharts, Finite State Machines (FSMs), global exception handlers, UI transparents, or the like. Task sequences may be linear processes for handling linear tasks between one or more applications or windows. Flowcharts may be configured to handle complex business logic, enabling integration of decisions and connection of activities in a more diverse manner through multiple branching logic operators. FSMs may be configured for large workflows. FSMs may use a finite number of states in their execution, which may be triggered by a condition, transition, activity, or the like. Global exception handlers may be configured to determine workflow behavior when encountering an execution error, for debugging processes, or the like. UI transparents can be software operations to an underlying operating system (OS) or hardware. Non-limiting examples of operations that can be accomplished by one or more workflows may be one or more of performing log-ins, filling a form, information technology (IT) management, or the like.

Further, for attended operations, automation by the attended robot 202 may be performed by receiving input, commands, instructions, guidance, or the like from a third party component. For unattended operations, automation by the unattended robot 203 may be performed without third party inputs or control.

According to one or more embodiments, the one or more robots and the executor 170 201, 202, and 203 may be split, distributed, or the like into several components, each being dedicated to a particular automation task or activity. Robot components may include SCM-managed robot services, user mode robot services, executors, agents, command line, or the like. SCM-managed robot services may manage or monitor Windows® sessions and act as a proxy for an execution hosts (i.e., the on premises system 110 on which the one or more robots 201, 202, and 203 are executed). These services may be trusted and managed with credentials.

According to one or more embodiments, the activities 222 and/or the UI automations 224 may be performed by the robot 201 using the drivers 226 therein, the driver components 230, and/or the modules 240. The drivers 226 may be utilized for UI automation by the robot 201 to get elements of a UI. The driver components 230 may include, but are not limited to, OS drivers, browser drivers, virtual machine drivers, enterprise drivers, and the like. In certain configurations, the modules 240 may be a driver used for UI automation. Further, any of these actions by the robot 201 can be implemented by the attended robots 202 and the unattended robots 203.

Further, FIG. 2 shows a system memory 200 storing machines 250, webhooks 260, scripts 270, applications macros 280, and other entities 290.

The machine 250 can include any mathematical model that defines an algorithm and or logic.

The webhook 260 can include any mechanism or interface for augmenting or altering a behavior of a web page or application with custom callbacks. Callbacks can be maintained, modified, and managed by users/developers for operation within the on premises system 110 of FIG. 1.

The script 270 can include any list of commands executed by software to automate processes on the on premises system 110 of FIG. 1.

The applications macro 280 can include any built-in application feature for carrying out a sequence and enabling recordation of the sequence and/or result.

The entities 290 can include identifiable and separate objects, bits of the data 160 of FIG. 1, user specific arrangements, and/or distinct system components. Other examples of entities 290 include, but are not limited to, packages, libraries, folders, calendars, environments, triggers, assets, metadata, etc.

Each of the one or more robots 201, 202, and 203, the machines 250, the webhooks 260, the scripts 270, the applications macros 280, and the entities 290 can operate based on user configurations, manually created settings, configurations, triggers, etc.

For example, to run a workflow for UI automation, the robot 201 may need to uniquely identify specific screen elements, such as buttons, checkboxes, text fields, labels, etc., regardless of application access or application development. Examples of application access may be local, virtual, remote, cloud, Citrix®, VMWare®, VNC®, Windows® remote desktop, virtual desktop infrastructure (VDI), or the like. Examples of application development may be win32, Java, Flash, hypertext markup language (HTML), HTML5, extensible markup language (XML), JavaScript, C#, C++, Silverlight, or the like.

According to one or more embodiments, at development, the robot 201 can be produced at/by a designer (e.g., in a studio software). Further, at deployment, the robot 201 may be managed, controlled, configured or the like at/by a conductor (e.g., within the on premises system 110 of FIG. 1). At deployment, the robot 201 may also be executed within an executor (e.g., within the on premises system 110 of FIG. 1). In an example, a user input (e.g., a selection on a display) can be submitted by a user or an operator to the designer 110. From the selection, which the designer 110 may provide to the robot 122, the robot 122 may determine representative data of area(s) of a visual display (e.g., selected by the user or the operator).

The migration engine 101 can be stored as software components, modules, engines, instructions, or the like for execution by the processor 121 to cause the on premises system 110 to operate, such as described herein with reference to FIGS. 3-10. For instance, the migration engine 101 can provide a specific configuring and tooling robotic process automation method with respect to an intelligent migration experience. The intelligent migration experience can include using robot intelligence (e.g., machine learning and artificial intelligence) to perform background monitoring/analyzing of user activity for purposes of identifying, collecting/harvesting, and moving the automations 152 and the data 160. Thus, the migration engine 101 can be a self-serve desktop application, requiring no code to provide a low barrier of entry that enables an average business user to use it.

In accordance with one or more embodiments, the migration engine 101 can be part of a framework/mechanism (e.g., the architecture 100) that automatically implements codes and designs of the operations 171 and 172 to provide application integration, along with automating of third-party applications, administrative information technology (IT) tasks, and/or business IT processes. Further, the migration engine 101 can include robot intelligence and/or can instruct the automations 152 to execute or monitor a workflow in a mainframe, web, virtual machine, remote machine, virtual desktop, enterprise platform, online platform, desktop app(s), browser, or the like client, application, or program. Furthermore, the migration engine 101 can be configured for provisioning, deployment, configuration, queueing, monitoring, logging, and/or providing interconnectivity. Provisioning may include creating and maintenance of connections or communication between the one or more robots, the on premises system 110, and the cloud environment 111. Deployment may include assuring the delivery of package versions to assigned robots for execution. Configuration may include maintenance and delivery of robot environments and process configurations. Queueing may include providing management of queues and queue items. Monitoring may include keeping track of robot identification data and maintaining user permissions. Logging may include storing and indexing logs to the repository 151 (e.g., an SQL database) and/or another storage mechanism (e.g., ElasticSearch®, which provides the ability to store and quickly query large datasets). The migration engine 101 may, also, provide interconnectivity by acting as the centralized point of communication for third-party solutions and/or applications.

According to one or more embodiments, the migration engine 101 can be configured in hardware, software, or a hybrid implementation. The migration engine 101 can be composed of modules that are in operative communication with one another, and to pass information or instructions.

According to one or more embodiments, the migration engine 101 can provide one or more user interfaces, such as on behalf of the on premises system 110, the cloud environment 111, and/or other application, as well as directly as needed to provide the intelligent migration experience. The user interfaces include, but are not limited to, internet browsers, graphic user interfaces, window interfaces, and/or other visual interfaces for applications, operating systems, file folders, and the like. Thus, user activity can include any interaction or manipulation of the user interfaces provided by the migration engine 101. The migration engine 101 can further include custom modules to perform application specific processes or derivatives thereof, such that the on premises system 110 may include additional functionality. For example, according to one or more embodiments, the migration engine 101 may be configured to store information, instructions, commands, or data to be executed or processed by the processor 121 to enable the operations 171 and 172 (i.e., an import and export operations as described with respect to FIG. 3).

Figure 3:
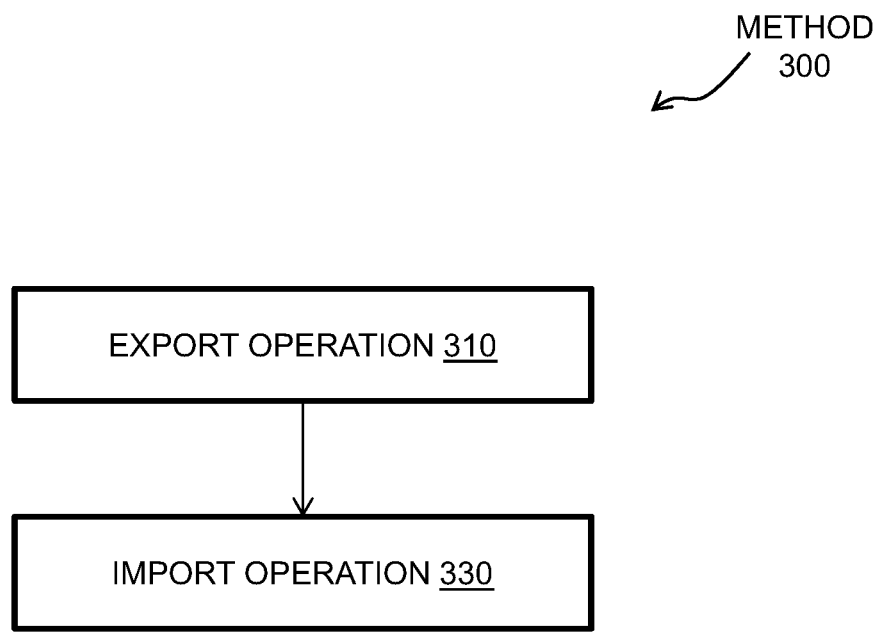
FIG. 3 depicts a method according to one or more embodiments.

Turning now to FIG. 3, a method 300 is depicted according to one or more embodiments. The method 300 is described with respect to FIGS. 1-2, as implemented by the migration engine 101 of FIG. 1 (which is being executed by the one or more processors 121 within the on premises system 110). Generally, the method 300 overcomes the manually recreation process by automatically and intelligently migrating from the on premises system 119 to the cloud environment 110. For instance, the method 300 of the migration engine 101 takes an existing application 119 (e.g., an On-Prem Orchestrator) of the on premises system 110 and replicates the data 160 thereof into the cloud environment 111 (e.g., a cloud organization or a Cloud Orchestrator). This enables users of the existing application 119 to move their existing automations 152 and setup to the cloud environment 111 seamlessly, while receiving a brief summary of the migration indicating successes and failures.

The method 300 begins at block 310, where the migration engine 101 implements an export operation (i.e., the operation 171 of FIG. 1). More particularly, the migration engine 101 implements the export operation for the on premises system 110. The export operation mines for the data 160 corresponding to the existing application 119, the automations 152, and/or user specific arrangements (e.g., extract copies of the entities 290). According to one or more embodiment, the migration tool 101 includes a full application programmable interface (API) to integrate with the existing application 119, detect dependencies between the entities 290 (i.e., parses through a validation layer of the entities), and detect errors with respect to those dependencies. In contrast to conventional operating and software systems and manual migration, generic scripts (i.e., generic programs or sequences of instructions) cannot detect such dependencies or errors.

According to one or more embodiments, the import operation can provide a first prompt or window (e.g., a user interface) requiring one or more credentials, such as a tenant name or a username and requiring a password. The migration engine 101, in conjunction with the export operation, can generate an entry list (e.g., provided via a user interface) that presents a summary of the data 160 mined.

The method 300 continues at block 330, where the migration engine 101 implements an import operation (i.e., the operation 172 of FIG. 1). The import operation migrates/moves the data 160 to the cloud environment 111 to replicate the automations 152 or user specific arrangements (e.g., recreates the entities 290). As shown in FIG. 1, based on operations 171 and 172 of the migration engine 101, the migrated automations 152 and the data 160 are represented by the dotted-outline.

The migration engine 101, in conjunction with the import operation, can generate an entry list (e.g., provided via a user interface) that presents a summary of the data 160 replicated, as well as an error list corresponding to call rejections and warning of dependencies issues. According to one or more embodiments, the import operation by the migration engine 101 can include a piece meal migration. The piece meal migration can determine what portions of the data 160 exists on the cloud environment 111 and can add only non-existing portions of the data 160.

According to one or more embodiments, the migration engine 101 and the method 300 can be implemented in both air gapped environment and connected environments, with respect to the on premises system 100. For example, air gapped environment can be privately run, not exposed to internet, which requires a physically move to between computers/systems. In turn, the migration engine 101 can export the data 160 while the on premises system 100 is configured as an air gapped environment, can store the exported data 160 locally (e.g., in the repository 151), and can import the stored data 160 to the cloud environment 111 once connected.

Figure 4:
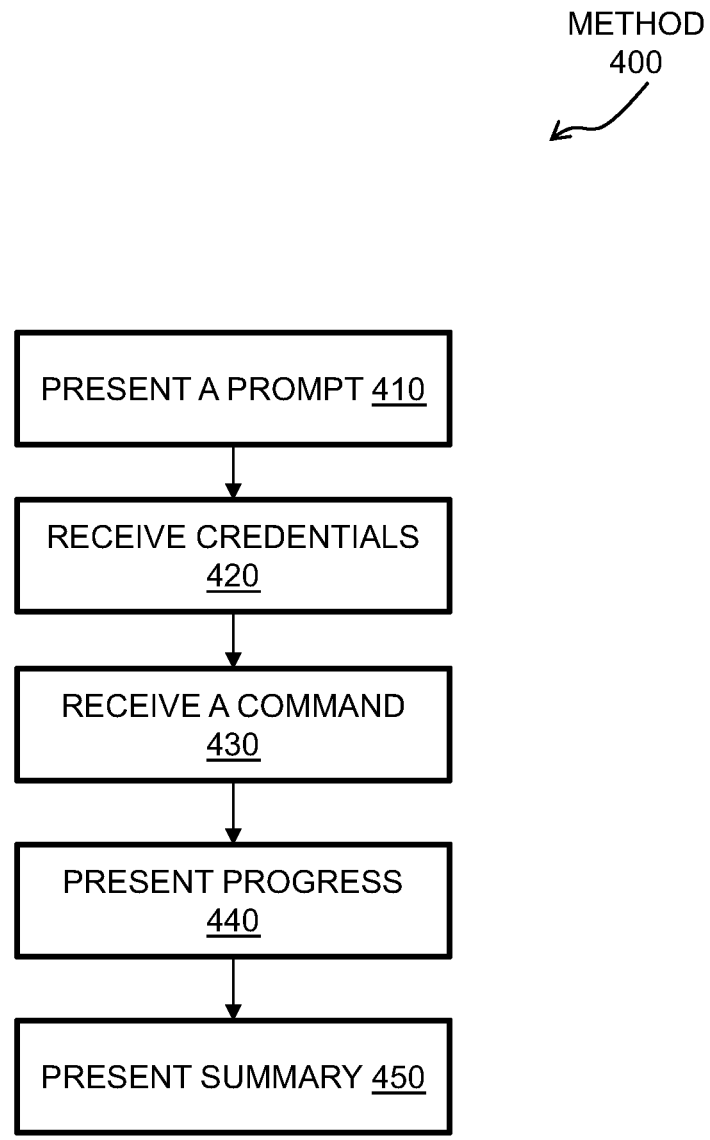
FIG. 4 depicts a method according to one or more embodiments.

Turning now to FIG. 4, a method 400 is depicted according to one or more embodiments. The method 400 is described with respect to an export operation (i.e., the operation 171 of FIG. 1), as implemented by the migration engine 101 of FIG. 1.

The method 400 begins at block 410, where the migration engine 101 presents a (first) prompt. In this regard, the output devices 141 can provide or display the first prompt for a user to view. The first prompt can request one or more credentials, and can include at least a mechanism for confirming the initiation of the export operation, such as a "start" button.

Figure 5:
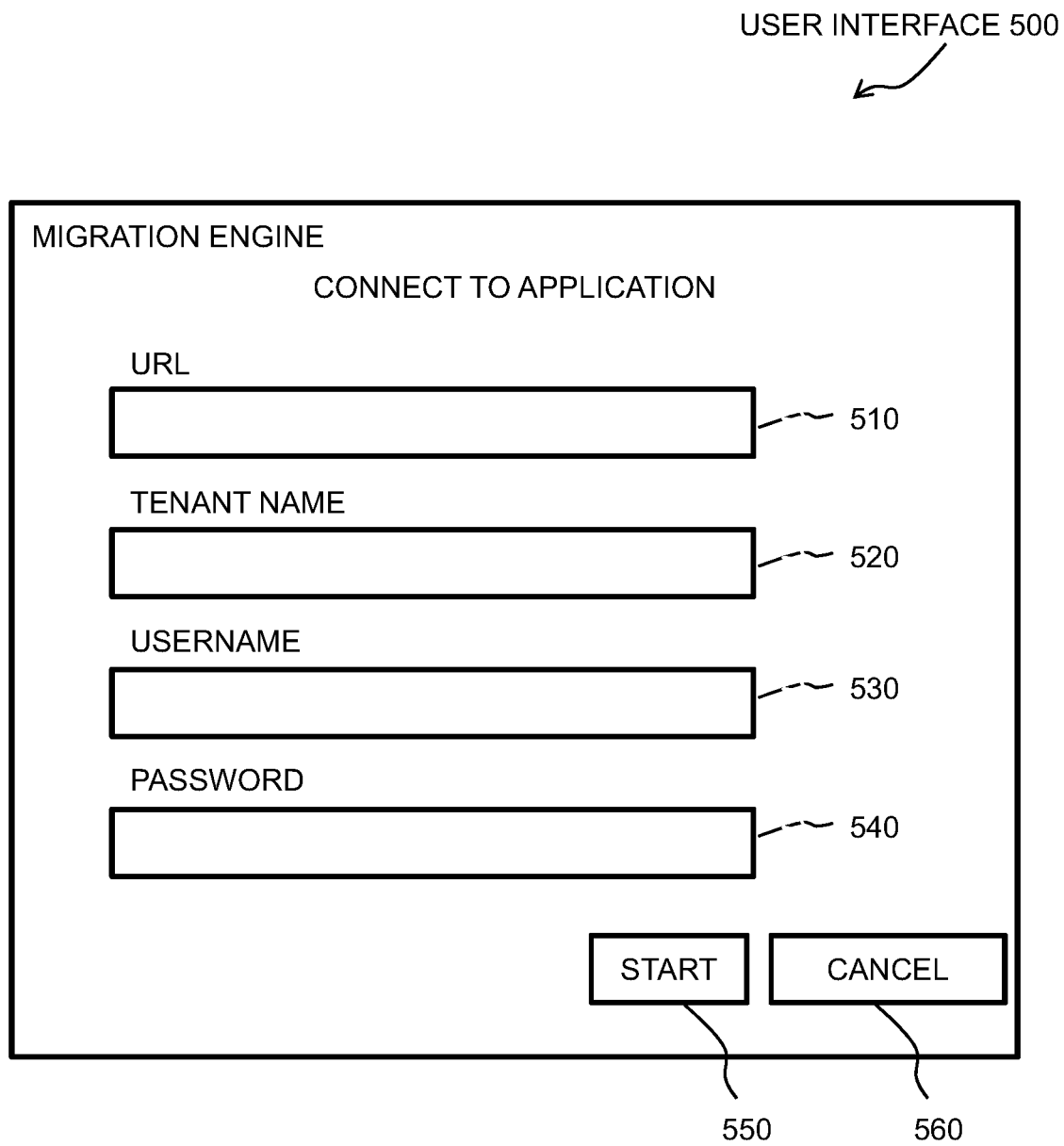
FIG. 5 depicts an example user interface according to one or more embodiments.

FIG. 5 depicts an example user interface 500 (e.g., the first prompt) according to one or more embodiments. The example user interface 500, as generated by the migration engine 101, requests the one or more credentials, such as a uniform resource locator (URL) 510, a tenant name 520, a username 530, and/or a password 540, as well as provides a "start" button 550 and a "cancel" button 560.

The URL 510 is a location or address identifying where the existing application 119 (e.g., the On-Prem Orchestrator) of the on premises system 110 and the corresponding data 160 can be found. The tenant name 520 is an identification for a group of users who share a common access with specific privileges to the existing application 119, the automations 151, and the data 160. The username 530 is an identification of a user of the group who utilizes the automations 151 and the data 160. The password 540 is a string of alpha-numeric characters for authenticating the user. The "start" button 550 can initiate the export operation. The "cancel" button 560 exit the example user interface 500.

At block 420, the migration engine 101 receives the one or more credentials through the first prompt. In this regard, the user can engage the input device 142 to input the credentials requested by the example user interface 500.

At block 430, the migration engine 101 receives a command (e.g., click of the "start" button 550) to initiate the export operation (e.g., start exporting data from On-Prem Orchestrator).

Figure 6:
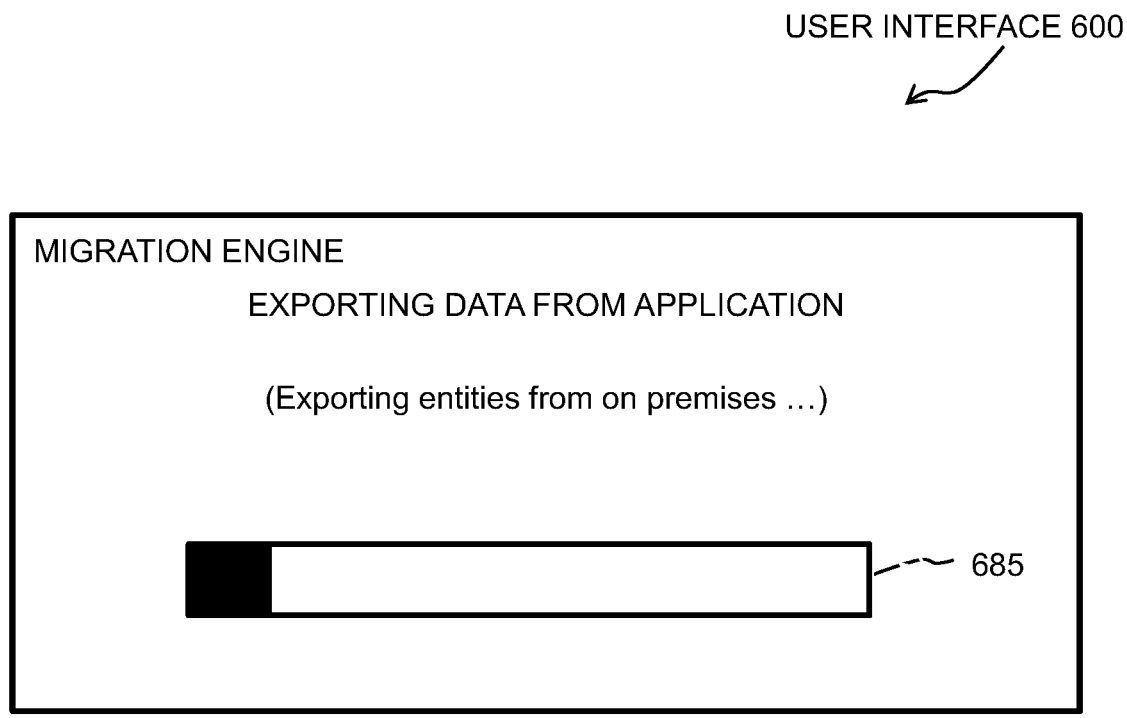
FIG. 6 depicts an example user interface according to one or more embodiments.

At block 440, the migration engine 101 presents a progress of the export operation in a second prompt. In this regard, the output devices 141 can provide or display the second prompt for the user to view. The second prompt can present a loading screen indicating a progress of the export operation. Turning to FIG. 6, an example user interface 600 is depicted as the second prompt according to one or more embodiments. The example user interface 600, as generated by the migration engine 101, includes a loading screen indicating an exportation of the data 160 from the on premises system 110. The example user interface 600 can include a progress bar 685 and can indicate which entity is currently being exported at a point in time.

Figure 7:
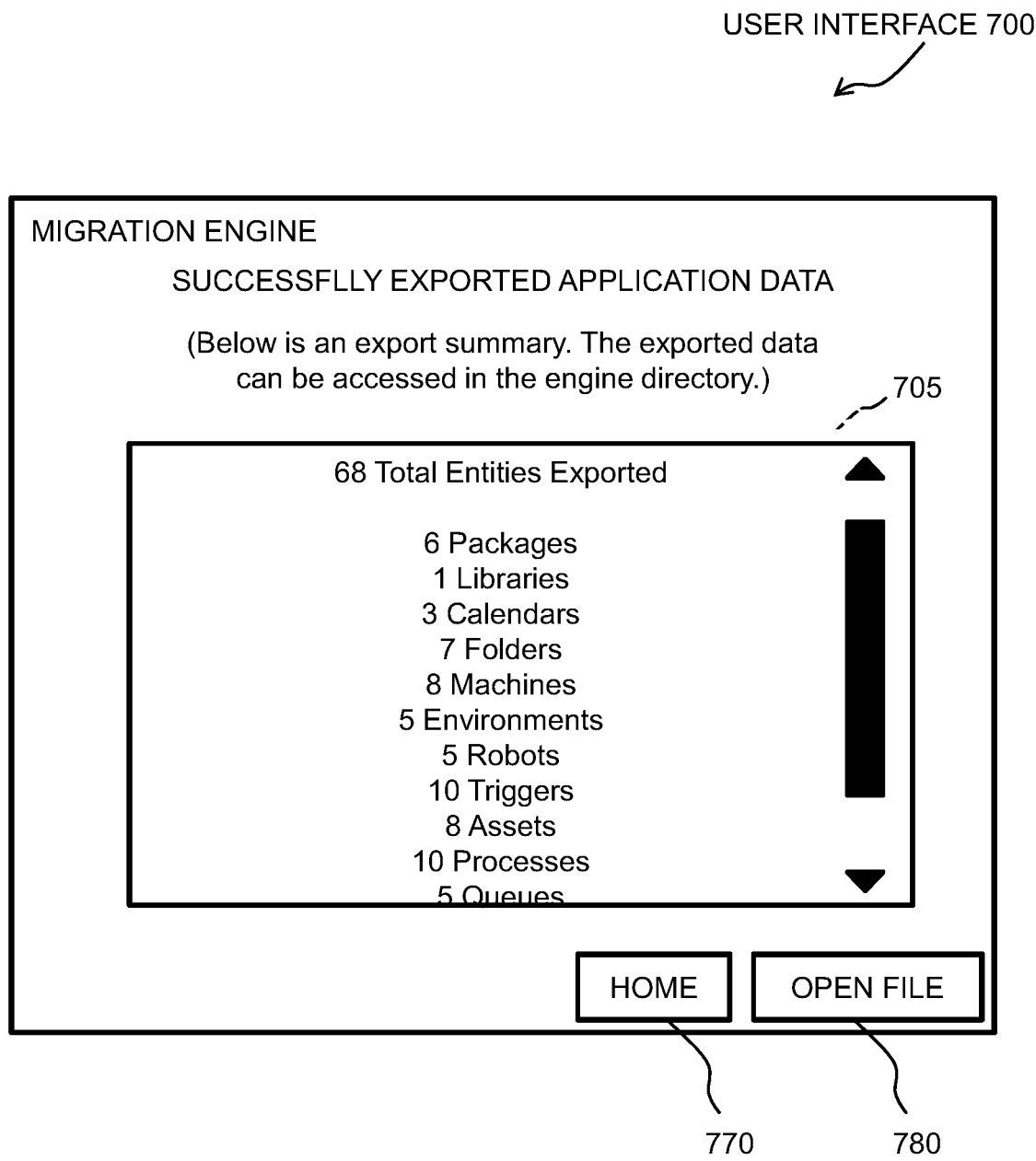
FIG. 7 depicts an example user interface according to one or more embodiments.

At block 450, the migration engine 101 present a third prompt. In this regard, the output devices 141 can provide or display the third prompt for the user to view. The third prompt can present summary of successfully imported entities (e.g., an exported entity list) to the user to view. According to one or more embodiments, the exported entity list itemizes the data 160 corresponding to the automations 152 or the user specific arrangements from the on premises system 110. The exported data 160 can be stored within the repository 151. Turning to FIG. 7, an example user interface 700 is depicted as the third prompt according to one or more embodiments. The example user interface 700 include a window 705, a "home" button 770, and a "open file" button 780. The window 705 can provide the exported entity list. As shown, the exported entity list can include a number of total entities exported, packages, libraries, calendars, folders, machines, environments, robots, triggers, assets, processes, queues, etc. The migration engine 101 can save the exported entity list as a summary file in the repository 151, such as in a text file format. That is, the exported entity list corresponds to all exported data from the existing application 119 and can be stored locally in the repository 151, such as in serialized JavaScript Object Notation (JSON) format, which is open standard file format and data interchange format. The "home" button 770 can return to the migration engine 101 to the first prompt or advance the migration engine 101 to the import operation as described with respect to FIG. 8. The "open file" button 780 can enable further viewing of any selected item of the exported entity list.

Figure 8:
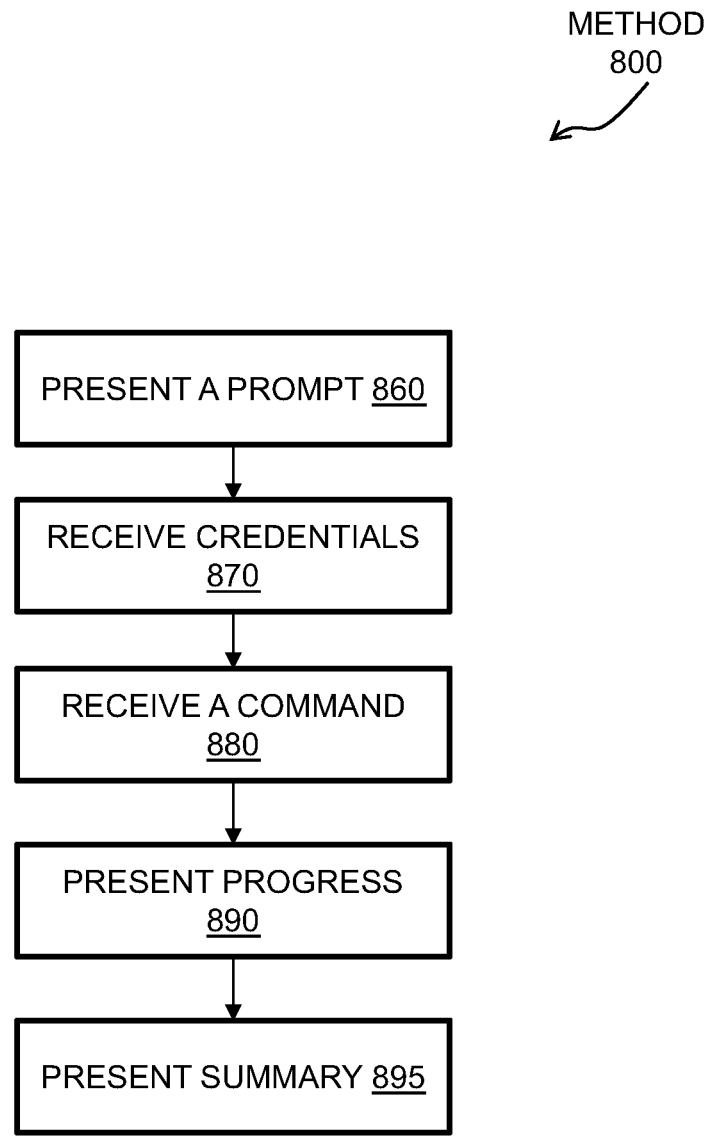
FIG. 8 depicts a method according to one or more embodiments.

Turning now to FIG. 8, a method 800 is depicted according to one or more embodiments. The method 800 is described with respect to an import operation (i.e., the operation 172 of FIG. 1), as implemented by the migration engine 101 of FIG. 1. The method 800 begins at block 850, where the migration engine 101 presents a prompt or first window (e.g., a user interface). In this regard, the output devices 141 can provide or display the first window for a user to view. The first window can request one or more credentials, and can include at least a mechanism for confirming the initiation of the import operation, such as a "start" button. In this regard, the migration engine 101 can open a newly created tenant, where the user desires to migrate the exported data 160. The migration engine 101 can receive an API access key or user key, an account name, a tenant name, and a client identification (ID) and copy these details for importing the exported data 160 to the newly created tenant.

Figure 9:
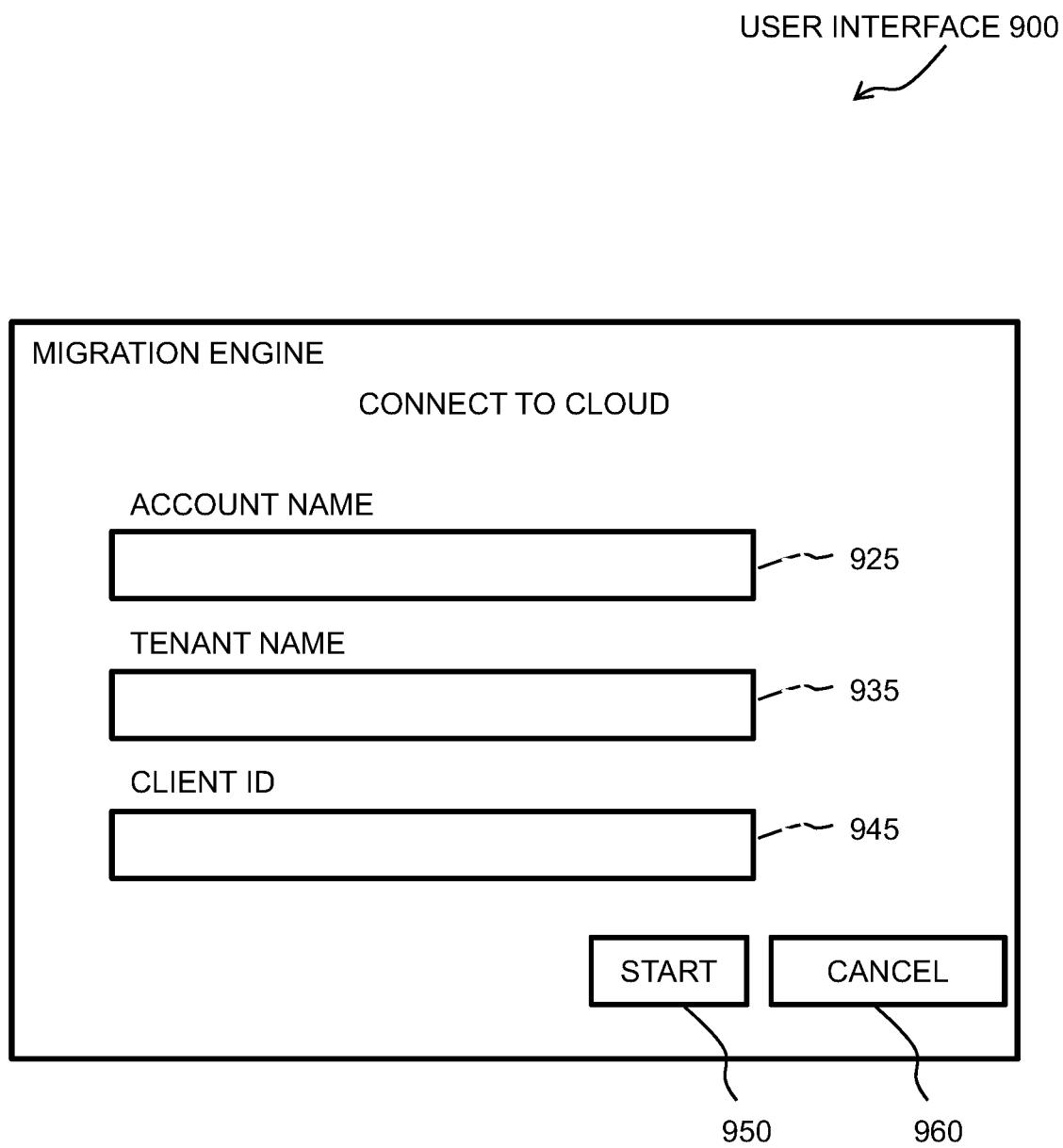
FIG. 9 depicts an example user interface according to one or more embodiments.

FIG. 9 depicts an example user interface 900 (e.g., the first window) according to one or more embodiments. The example user interface 900, as generated by the migration engine 101, requests the one or more credentials, such as an account name 925, a tenant name 935, and/or a client ID 945, as well as provides a "start" button 950 and a "cancel" button 960.

The account name 925 is a unique URL site. The tenant name 935 is an identification for a group of users who share a common access with specific privileges to the existing application 119, the automations 151, and the data 160. The client ID 945 is an identification of a user of the group who utilizes the automations 151 and the data 160. The client ID 945 can be specific to the existing application 119 itself and be the same for all users and tenants on the on premises system 110.

The "start" button 950 can initiate the import operation. That is, the "start" button 950 can be a "Start Import" button that, when pressed, causes the migration engine 101 to present a login screen (e.g., that points to the account name 925). Once logged-in (e.g., using an account associated), the migration engine 101 verifies that the import operation is authorized to run and the import operation resumes. The "cancel" button 960 exit the example user interface 900.

Optionally, according to one or more embodiments, a user key field can be included in the example user interface 900. The user key field can be an encrypted string that identifies an application (e.g., the cloud organization or the Cloud Orchestrator that mirrors the existing application 119 or the On-Prem Orchestrator). The migration engine 101 can generate unique login keys (i.e., the user key enables) used with APIs to log in and perform actions on a user's behalf.

At block 870, the migration engine 101 receives the one or more credentials through the first window. In this regard, the user can engage the input device 142 to input the credentials requested by the example user interface 900.

At block 880, the migration engine 101 receives a command (e.g., click of the "start" button 950) to initiate the import operation (e.g., start import data to the Cloud Orchestrator).

At block 890, the migration engine 101 presents a progress of the import operation in a second window. In this regard, the output devices 141 can provide or display the second window for the user to view. The second window can present a downloading screen indicating a progress of the import operation.

Figure 10:
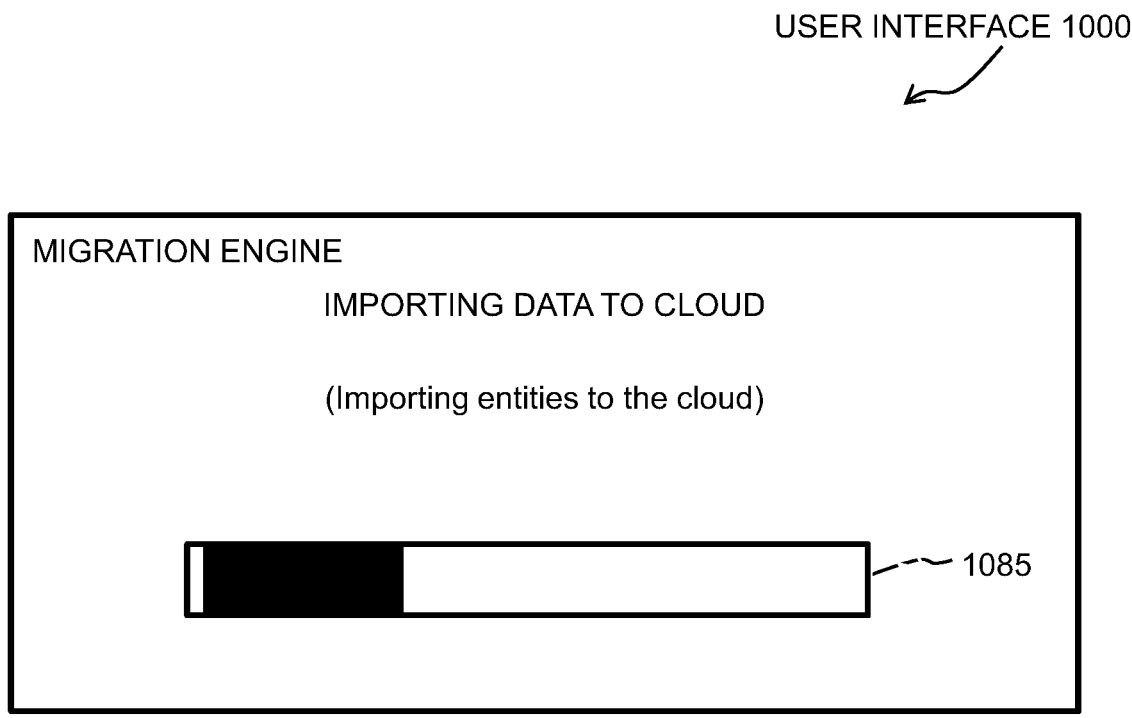
FIG. 10 depicts an example user interface according to one or more embodiments.

Turning to FIG. 10, an example user interface 1000 is depicted as the second window according to one or more embodiments. The example user interface 1000, as generated by the migration engine 101, includes a downloading screen indicating an importation of the data 160 to the cloud environment 111. The example user interface 1000 can include a progress bar 1085 and can indicate which entity is currently being imported at a point in time.

Figure 11:
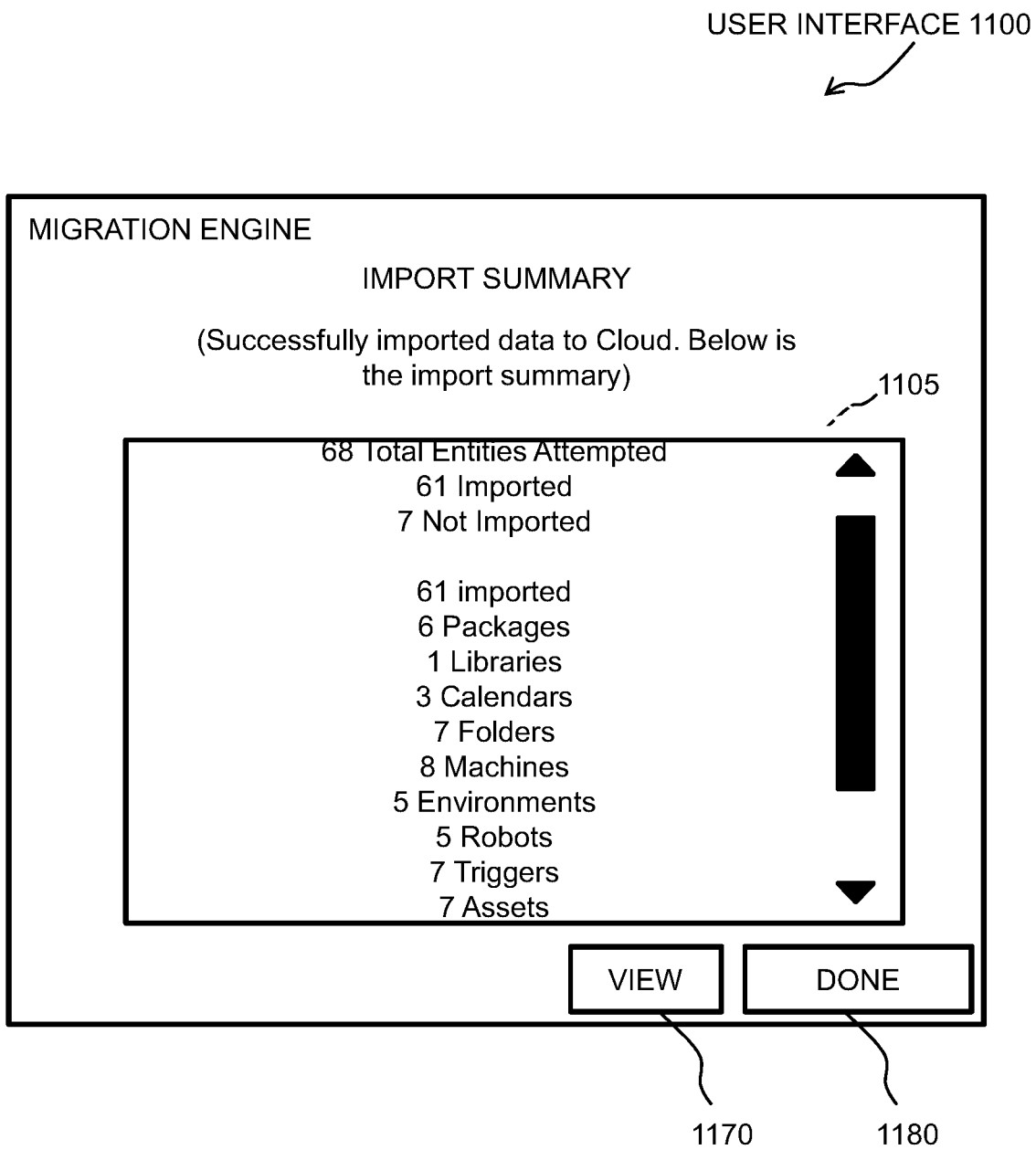
FIG. 11 depicts an example user interface according to one or more embodiments.

At block 895, the migration engine 101 present a third window. In this regard, the output devices 141 can provide or display the third window for the user to view. The third window can present summary of successfully imported and failed entities (e.g., an importation list). According to one or more embodiments, the importation list itemizes the data 160 corresponding to the automations 152 or the user specific arrangements from the on premises system 110 that was imported and/or failed. Turning to FIG. 11, an example user interface 1100 is depicted as the third window according to one or more embodiments. The example user interface 1100 include a window 1105, a "view" button 1170, and a "done" button 1180. The window 1105 can provide the importation list. As shown, the importation list can include a number of total entities attempted, imported, and note imported, as well as a number for each entity. The "view" button 1170 can enable further viewing of any selected item of the importation list. The "done" button 1180 can exit the example user interface 1100.

Further, this data 160 and the importation list can be stored within the repository 151, such as in text file format as described herein. Each failed entity of the importation list can correspond to an error related to API call rejection while importing. Each failed entity of the importation list can further include one or/and the warnings are related to dependencies, which in turn can be rectified by a manual check. For instance, errors can occur on an import operation due to business validations. In some cases, the migration engine 101 can make calls and determinations so that the errors can be resolved automatically. For example, if a schedule is dependent on a package and the package is not exported and/or uploaded, the migration engine 101 can detect the dependency of schedule on package and write a warning or directly identify, copy, and import the package to resolve the dependency. Additionally, while importing, entities that are not sequenced randomly because of their dependencies may require a document for indicating specific order of entity folders for cloud migration. The migration engine 101 can generate this document and outline rules for all the dependencies. For example, if there is a job that uses a package, then the package has to be first and the migration engine 101 can create a rule that imports that package first (according to the document).

According to one or more embodiments, the migration engine 101 can implement a piece meal migration for the cloud tenant when some of the data already exists. In this regard, when the import operation is performed, the migration engine 101 determines what data exists already in the cloud environment 111 and only adds data that is not yet existing.

The flowchart and block diagrams in the drawings illustrate the architecture, functionality, and operation of possible implementations of apparatuses, systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the flowchart and block diagrams in the drawings. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although features and elements are described above in particular combinations, one of ordinary skill in the art will appreciate that each feature or element can be used alone or in any combination with the other features and elements. For instance, for any of the methods and processes described herein, the steps recited may be performed out of sequence in any order and sub-steps not explicitly described or shown may be performed. When using referring to "A or B", it may include A, B, or A and B, which may be extended similarly to longer lists. When using the notation X/Y it may include X or Y. Alternatively, when using the notation X/Y it may include X and Y. X/Y notation may be extended similarly to longer lists with the same explained logic. In addition, "coupled" or "operatively coupled" may mean that objects are linked but may have zero or more intermediate objects between the linked objects. Also, any combination of the disclosed features/elements may be used in one or more embodiments.

In addition, the methods and processes described herein may be implemented in a computer program, software, and/or firmware (e.g., a computer program product) incorporated in a computer-readable medium for execution by a computer or processor. That is, the computer program product may include a computer readable storage medium (or media) having computer readable program instructions thereon for causing a controller, processor, or the like to carry out aspects of the present invention.

The computer readable storage medium can be a tangible device that can retain and store computer readable program instructions. The computer readable storage medium may be, for example, but is not limited to, an electronic storage device, a magnetic storage device, an optical storage device, an electromagnetic storage device, a semiconductor storage device, or any suitable combination of the foregoing. The computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Examples of computer-readable storage media include, but are not limited to, a register, cache memory, semiconductor memory devices, magnetic media such as internal hard disks and removable disks, magneto-optical media, optical media such as compact disks (CD) and digital versatile disks (DVDs), a random access memory (RAM), a read-only memory (ROM), an erasable programmable read-only memory (EPROM or Flash memory), a static random access memory (SRAM), and a memory stick.

The computer readable program instructions described herein can be communicated and/or downloaded to respective controllers, processors, or the like from an apparatus, device, computer, or external storage via a connection, for example, network communications. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used herein, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A system comprising:
    a memory configured to store processor executable instructions for a migration engine; and
    at least one processor coupled to the memory and configured to execute the processor executable to cause the system to:
        implementing, by the migration engine, an export operation for an on premises system to mine for data corresponding to automations or user specific arrangements;
        implementing, by the migration engine, an import operation of the data to a cloud environment to replicate the automations or the user specific arrangements, the import operation comprising detecting dependencies of the automations or the user specific arrangements to detect one or more errors and automatically resolving the one or more errors,
        wherein the migration engine generates an importation list comprising an itemization of the data corresponding to the automations or the user specific arrangements from the on premises system as one or more entities that were attempted, the importation list providing a summary of the data replicated and an error list corresponding to call rejections and warning of dependencies of schedules on a package.

2. The system of claim 1, wherein the user specific arrangements comprises settings, configurations, triggers, and preferences.

3. The system of claim 1, wherein the automations comprises robots, machines, webhooks, scripts, applications macros, and entities.

4. The system of claim 1, wherein the export operation provides a prompt requiring a tenant name or a username and requiring a password.

5. The system of claim 1, wherein the migration engine generates an entry list presenting a summary of the data mined and replicated.

6. The system of claim 1, wherein the migration engine implements a piece meal migration, during the import operation, that determines what portions of the data exists on the cloud environment and adds only non-existing portions of the data.

7. The system of claim 1, wherein the system comprises an air gapped environment and a connected environment.

8. The system of claim 1, wherein the migration engine generates an error list corresponding to call rejections and warning of dependencies issues.

9. The method of claim 8, wherein items of the error list are configured to be viewed and rectified to complete the import of the items.

10. The system of claim 1, wherein the data corresponding to the automations or the user specific arrangements from the on premises system is stored with a repository of the on premises system in serialized JSON format.

11. The system of claim 1, wherein the one or more errors corresponds to the dependencies of the automations or the user specific arrangements failing due to an application programmable interface call by the migration engine on behalf of the automations or the user specific arrangements being rejected during the import operation.

12. The system of claim 1, wherein the migration engine detects the dependencies of schedules on the package and writes warnings.

13. A method implemented by a migration engine stored as processor executable instructions in a memory coupled to at least one processor, the method comprising:
    implementing an export operation for an on premises system to mine for data corresponding to automations or user specific arrangements; and
    implementing an import operation of the data to a cloud environment to replicate the automations or the user specific arrangements, the import operation comprising detecting dependencies of the automations or the user specific arrangements to detect one or more errors and automatically resolving the one or more errors,
    wherein the migration engine generates an importation list comprising an itemization of the data corresponding to the automations or the user specific arrangements from the on premises system as one or more entities that were attempted, the importation list providing a summary of the data replicated and an error list corresponding to call rejections and warning of dependencies of schedules on a package.

14. The method of claim 13, wherein the user specific arrangements comprises settings, configurations, triggers, and preferences.

15. The method of claim 13, wherein the automations comprises robots, machines, webhooks, scripts, applications macros, and entities.

16. The method of claim 13, wherein the export operation provides a prompt requiring a tenant name or a username and requiring a password.

17. The method of claim 13, wherein the migration engine generates an entry list presenting a summary of the data mined and replicated.

18. The method of claim 13, wherein the migration engine implements a piece meal migration, during the import operation, that determines what portions of the data exists on the cloud environment and adds only non-existing portions of the data.

19. The method of claim 13, wherein the system comprises an air gapped environment and a connected environment.

20. The method of claim 13, wherein the data corresponding to the automations or the user specific arrangements from the on premises system is stored with a repository of the on premises system in serialized JSON format.

* * * * *